United States Patent [19]

Muchel

[11] 4,420,219

[45] Dec. 13, 1983

[54] OPTICAL WAVEGUIDE CONNECTOR USING ASPHERIC LENSES

[75] Inventor: Franz Muchel, Königsbronn, Fed. Rep. of Germany

[73] Assignee: Carl-Zeiss-Stiftung, Heidenheim, Fed. Rep. of Germany

[21] Appl. No.: 244,755

[22] Filed: Mar. 17, 1981

[30] Foreign Application Priority Data

Mar. 18, 1980 [DE] Fed. Rep. of Germany ....... 3010347

[51] Int. Cl.$^3$ .............................................. G02B 7/26
[52] U.S. Cl. ............................... 350/96.18; 350/96.2; 350/96.21
[58] Field of Search ............... 350/96.15, 96.16, 96.18, 350/96.19

[56] References Cited

U.S. PATENT DOCUMENTS

| | | | |
|---|---|---|---|
| 3,508,807 | 4/1970 | Mayer | 350/96.16 |
| 3,944,327 | 3/1976 | Larsen | 350/96.18 |
| 4,078,852 | 3/1978 | Lebduska | 350/96.18 |
| 4,183,618 | 1/1980 | Rush et al. | 350/96.18 |
| 4,185,885 | 1/1980 | Chown et al. | 350/96.18 |
| 4,268,112 | 5/1981 | Peterson | 350/96.18 |
| 4,290,667 | 9/1981 | Chown | 350/96.18 |

FOREIGN PATENT DOCUMENTS

| | | | |
|---|---|---|---|
| 54-9953 | 1/1979 | Japan | 350/96.18 |
| 55-35354 | 3/1980 | Japan | 350/96.19 |
| 55-130504 | 10/1980 | Japan | 350/96.19 |
| 1429843 | 3/1976 | United Kingdom | 350/96.18 |
| 1541787 | 3/1979 | United Kingdom | 350/96.18 |

OTHER PUBLICATIONS

Mito et al., *1978 Electronic Communication Soc. Nat. Conf.*, Paper No. 860, Mar. 1978, "Electrically Driven Rotating Mirror Type . . . ," pp. 1–4.

*Primary Examiner*—John D. Lee
*Assistant Examiner*—Frank González
*Attorney, Agent, or Firm*—Hopgood, Calimafde, Kalil, Blaustein & Judlowe

[57] ABSTRACT

A device for connecting first and second light guides to an external part. Each of the light guides extend into a housing which includes a converging aspheric plano-convex lens. The lenses are mounted so that the focal point of the lens is located at the end surface of the light guide and the aspheric surface of the lens faces the light guide. The planar surface of the lens forms a coupling surface to support immersion fluid for connection to the external part.

13 Claims, 9 Drawing Figures

OPTICAL WAVEGUIDE CONNECTOR USING ASPHERIC LENSES

BACKGROUND AND SUMMARY OF THE INVENTION

The present invention relates to a system of plugs, distributors and switches for light guides, in which the light guides are coupled with each other by image-forming optical elements.

For the detachable connection of two optical fibers use is predominantly made of plugs by which the optical fibers mounted therein come into direct contact after their end surfaces have been placed together. Due to the high requirements on the accuracy of the centering of such plugs, necessary in particular in the case of monomode fibers, they are expensive to manufacture. In the case of adjustable embodiments they must upon replugging in each case be precisely adapted to the new mating plug.

A similar picture is present in the case of light-guide switches or distributors. They consist of light guides firmly connected to each other which are arranged at their ends against each other or on a coupling plate, or else of fibers which are fused together. In such distributors the coupling ratio of the individual fibers is substantially fixed. It can still be influenced only under extremely high requirements as to precision with reference to the mechanism used, as described, for instance, in U.S. Pat. No. 3,874,779 or, when using polarized light, by applying external electromagnetic fields to the distributor, as described in DE-OS No. 28 53 149.

From West German Petty Patent No. 74 30 490, West German Unexamined Application for Patent No. 19 41 923 and U.S. Pat. No. 4,119,362 light-guide couplings are known in which one or more optical imaging-forming elements are used. The solutions described therein are, however, not adapted to reduce the demands on the precision of the centering of the light guides to be coupled.

It has also already been proposed to provide each of the light-guide plugs to be connected with a biconvex lens at the focal point of which the end surface of the corresponding light guide is arranged. Problems as to the centering of the two plugs with respect to each other are substantially avoided by the coupling in the widened parallel ray path of the plug connection. Since spherical lenses, in connection with the short focal lengths required for small plug dimensions, can, however, be adapted only poorly to the radiation characteristic of a glass fiber and because of the many glass-air interfaces such plugs, however, have relatively high coupling losses.

The object of the present invention is to create a device for connecting light guides which, with only slight coupling losses and without any great demand as to the dimensional precision of the movable or detachable parts, makes it possible to manufacture at low cost the inter-compatible components of a connector system such as plugs, distributors and switches.

This object is achieved in accordance with the body of the claims.

In both solutions for a device for the connecting of light guides the number of interfaces between media of different indices of refraction is minimized since the beam-widened optical elements are in direct contact with each other for instance by means of immersion oil or are placed directly on the light guides. The necessary refractive power is provided only by one, for instance aspherical, glass-air interface.

In addition, the advantages of the lens-plug principle, namely lack of sensitivity of the interfaces in the widened beam path to misadjustments of the parts coupled to each other are retained. Spacing errors between bushing and plug are of no importance in the case of a parallel ray path and lateral offset affects the coupling losses merely by an amount reduced by the ratio of light-guide diameter to lens diameter.

It need merely be seen to it that the bearing surfaces of plug and bushing extend parallel to the optical axes of the optical elements contained therein. This requirement can easily be satisfied upon the manufacture of the plugs. Subsequent centering of the plugs with respect to each other by the user is unnecessary.

For the solution indicated, aspherical refractive surfaces are selected in order to minimize the aperture errors of the two lenses forming a biconvex element which rest against each other in the immersion contact and thus to assure a sufficiently punctiform imaging of the light-guide end surfaces with an aperture which is adapted to their radiation characteristic.

In the solution shown in FIG. 2 with biconvex refractive surfaces and the medium, glass, between the light guide end surfaces and the vertex of the "air lens," the aperture defect remains within tolerable orders of magnitude even when spherical surfaces are used.

The device in accordance with the invention can be applied not only to plugs which serve for instance to connect two light guides together but it also includes distributors (light-guide branching) as well as switches and valves in which the coupling ratio of the connected light guides can be varied in discrete steps or continuously. They consists of a suitable housing provided with at least three bushings to receive the above-described plug connections, within which housing beam splitters or mirrors are arranged fixed or movable.

As beam splitters there are suitable, for instance, partially mirrored prisms or flat plates which distribute the incident light, independent of wavelength over a corresponding number of outputs. If the beam splitters are developed in the manner of interference filters, there is obtained an optical demultiplexer which distributes a multispectral light signal in wavelength-selective manner over the individual outputs.

In the same way as in the case of the detachable plug connections, a reduction in the requirements as to tolerance of the moved part are obtained also for switches and valves if said part is located in the widened ray path. The larger tolerances permitted by the lens-plug principle for the first time make it possible to create valves and switches for light-guide cables with which problemless continuous operation is possible.

In the case of switches or distributors the connections of which are frequently opened the imaging optical elemtns are preferably, as described above, integrated in the plugs themsleves. If such light regulators are intended, however, for fixed light-guide cabling then it is advantageous to arrange the imaging optical elements in the switch and to connect the light guide securely to the regulator or switch, for instance via a conventional centering plug. The lenses can then be produced in one piece by injection molding and in one particularly advantageous embodiment directly as part of the housing which contains the movable beam splitter.

BRIEF DESCRIPTION OF THE DRAWINGS

Various embodiments of the invention will be explained in further detail with reference to FIGS. 1 to 9 of the accompanying drawings.

DESCRIPTION OF THE PREFERRED EMBODIMENTS

Figure 1:
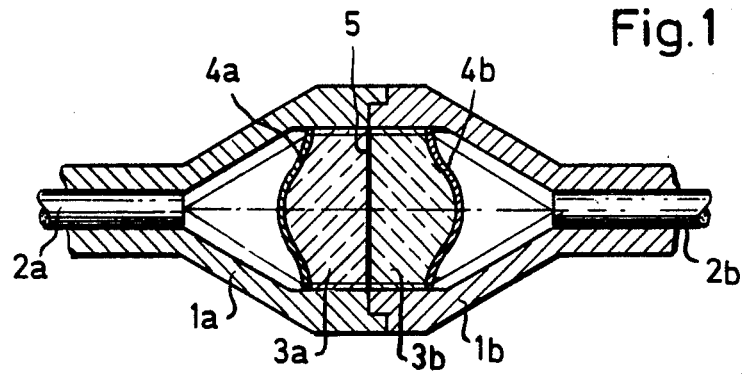
FIG. 1 diagrammatically shows a plug connection in accordance with a first embodiment.

The plug connection shown in FIG. 1 consists of two plugs 1a and 1b which engage in each other and in each of which there is fastened a light guide 2a and 2b and a plano-asphere 3a, 3b respectively. Both end surfaces of the light guides 2a and 2b are arranged in the focal point of the aspheres 3a and 3b which bear an anti-reflection coating 4a and 4b respectively on the side facing the light guide. Between the abutting flat surfaces of the two aspheres 3a and 3b there is a thin layer 5 of immersion oil which has the same index of refraction as the aspheres 3.

Figure 3:
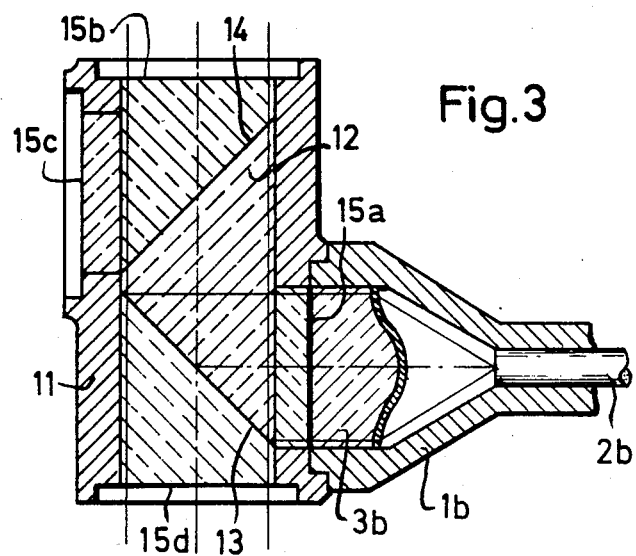
FIG. 3 diagrammatically shows a distributor with plug connection according to FIG. 1.

FIG. 3 shows a light-guide top which is compatible with the plug system shown in FIG. 1. The distributor consists of a housing 11 which has four couplings 15a–d whose outer shape corresponds to the plug 1a in FIG. 1. The housing 11 contains a plurality of prisms 12 which have their partially mirrored surfaces 13 and 14—arranged at an angle of 45° to the optical axis of the distributor—adjoining each other. The mirror surface 14 has a transmission factor of 0.67 while the mirror surface 13 has a transmission factor of 0.5.

The light output of a light guide coupled to the bushing 15b is thus distributed uniformly over three light guides connected by means of plugs 1b to the outputs 15a, c and d, only one of the light guides being shown. Of course, the coupling ratio can be selected in any value desired by a suitable selection of the transmission factor of the mirror surfaces 13 and 14.

As already shown in FIG. 1 a thin layer of immersion oil is present between the flat surfaces of the aspheres 3b and the surface of the beam splitter 12 in order to reduce coupling losses by reflection.

Figure 2:
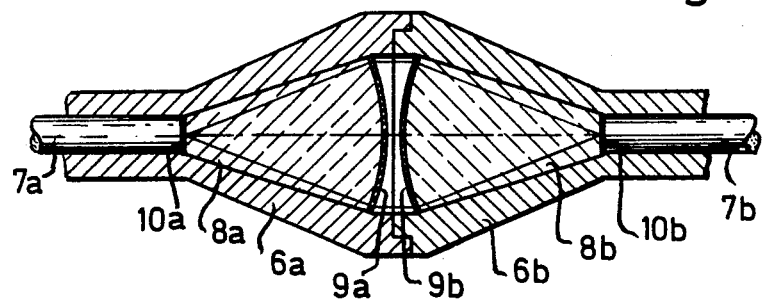
FIG. 2 diagrammatically shows a plug connection in accordance with an alternative embodiment.

The alternative embodiment of a plug connection for coupling two light guides which is shown in FIG. 2 consists of interengaged plugs 6a and 6b in each of which there is fastened one end of a light guide 7a or 7b respectively on the end surface of which there is placed a conical convex lens 8a or 8b respectively. Between the glass light guide and the plastic lens 8 there is in each case a layer of immersion oil 10a and 10b respectively. Of course, it is also possible to use lenses which are fused, bonded or glued directly to the light guide. The facing convex surfaces of the lenses 8a and 8b are provided with an anti-reflection coating 9a and 9b respectively while the lenses 8 are mirrored in the region of the cone.

The plug connection described has merely two air interface surfaces, which have an anti-reflection coating and thus has very low coupling losses.

Figure 4:
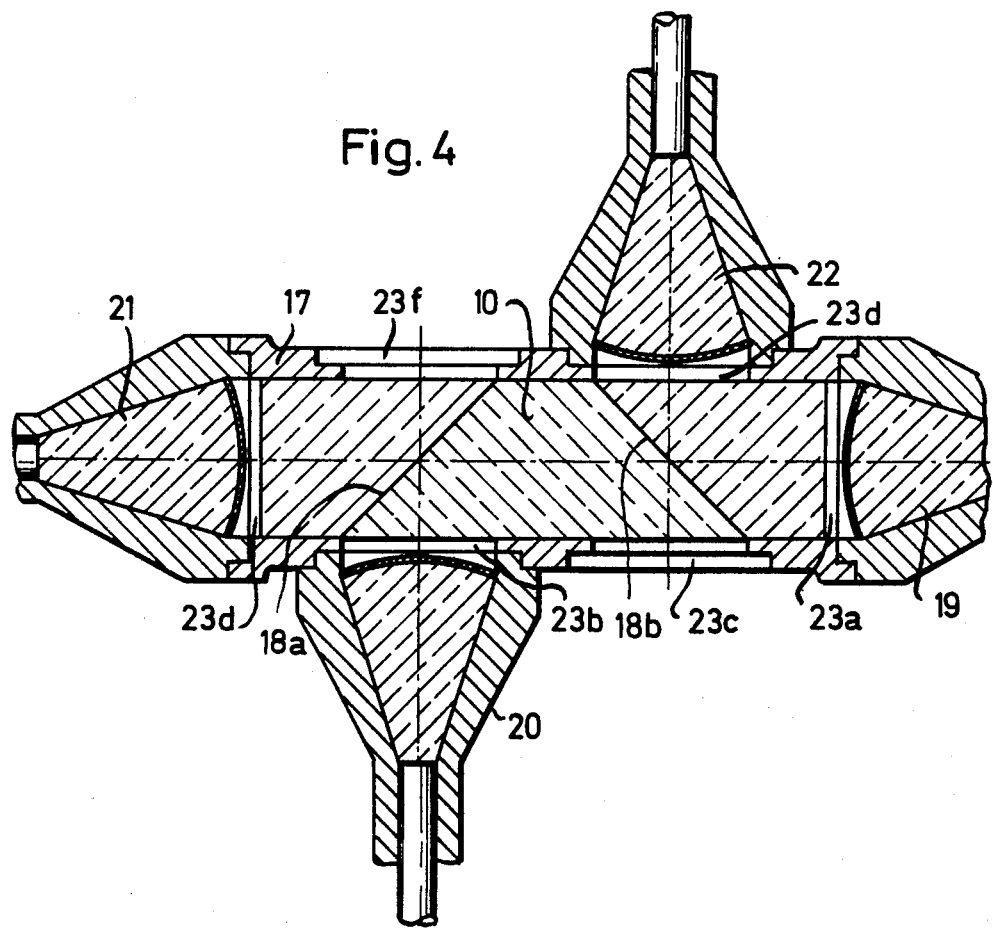
FIG. 4 diagrammatically shows a distributor with plug connection according to FIG. 2.

A distributor for this plug system is shown in FIG. 4. within a housing 17 which has six receiving couplings 23a–f, there is arranged a beam splitter 10 formed by three prisms, and the surface of which bears an anti-reflection coating in the region of the couplings 23. The partially permeable mirror surfaces 18a and b distribute the light fed via a plug 19 in the manner described in FIG. 3 to three light guides which are connected to each other via the plugs 20, 21 and 22 and the couplings 23b, d and e. A light signal which is fed via the plug 21 can be tapped off at the unoccupied couplings 23c and 23f. When suitably stably designed housings 17 are used for the distributor the direct interconnecting of a plurality of distributors to form a larger network is possible.

FIGS. 1 to 4 show plug connections which can even be replugged various times without difficulty by the user without any problem as to centering occurring since the beam widening elements 3b and 8 are arranged in the plug itself and are thus connected with the light guide.

In FIGS. 5 to 8 there are shown switches for light guides which are permanently "wired," i.e. are connected to several light guides which are attached in general rigidly to the switch housing. The widening of the beam in these cases takes place in the switch and serves to reduce the requirements as to precision which must be made on the movable switch element. For the connecting of switch housing and light guides ordinary commercial centering plugs can be used.

Figure 5:
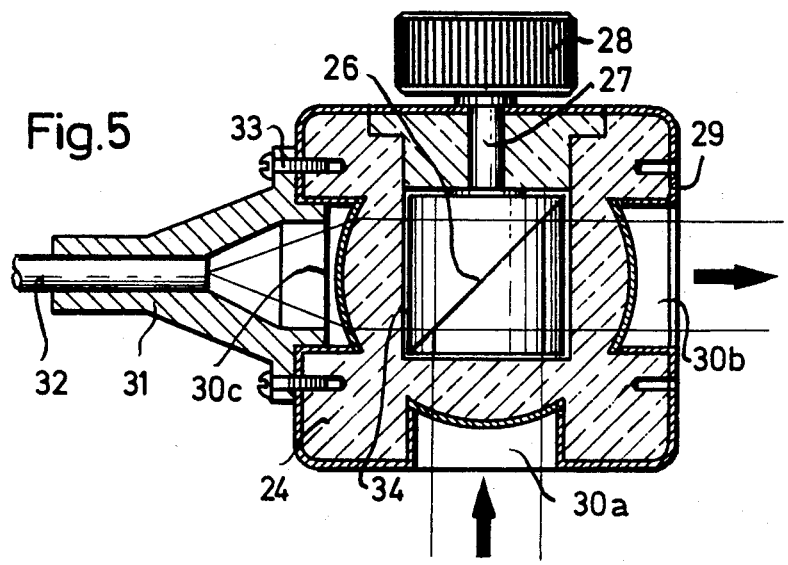
FIG. 5 diagrammatically shows an optical switch.

The switch shown in FIG. 5 has a rectangular housing 24 of transparent material within the cylindrical inside of which there is arranged a mirror 26 which can be turned via a shaft 27 by means of a kob 28 having fixed detent positions. The mirror 26 distributes the light entering through the receiving coupling 30b onto optionally, depending on the position of the switch, four coupling arranged radially and perpendicular to the axis of rotation, two of which, namely 30b and c, are shown in the drawing.

The transparent housing 24 is aspherically shaped and provided with an anti-reflection coating in the region of the receiving couplings. The depth of the receiving coupling is so selected that, in combination with the conventional centering plugs fastened thereto the end surface of the light guides lies again in the focal point of the corresponding asphere. In order to avoid reflections, the space between the cylindrical mirror support 25 and the switch housing is filled with immersion oil.

The switch surface 29 is made opaque in order to protect against stray light. The entire switch including the imaging optical system thus consists of a plastic part which can be produced at low cost by injection molding.

Figure 6:
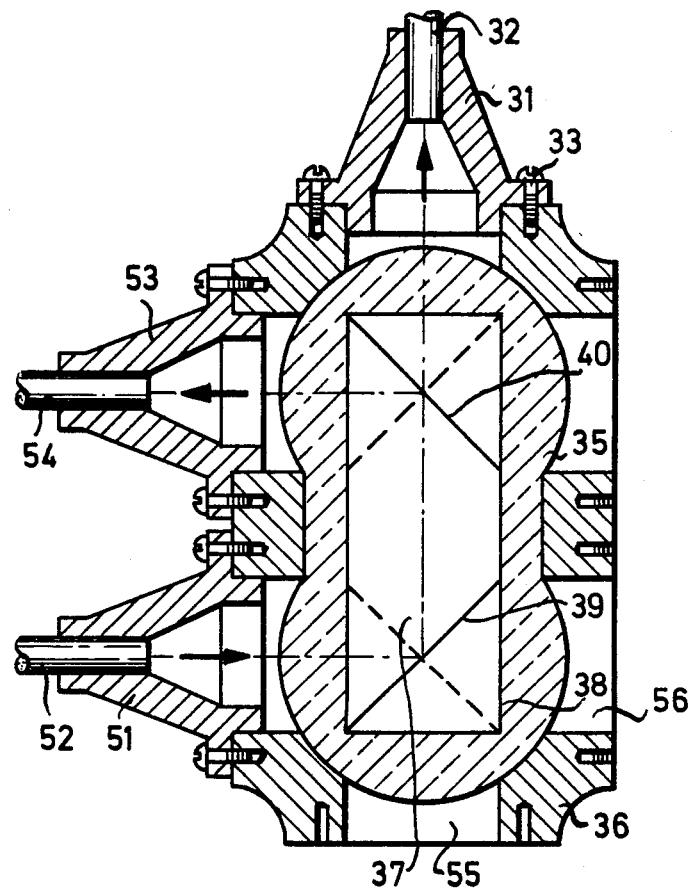
FIG. 6 diagrammatically shows a second optical switch.
Figure 7:
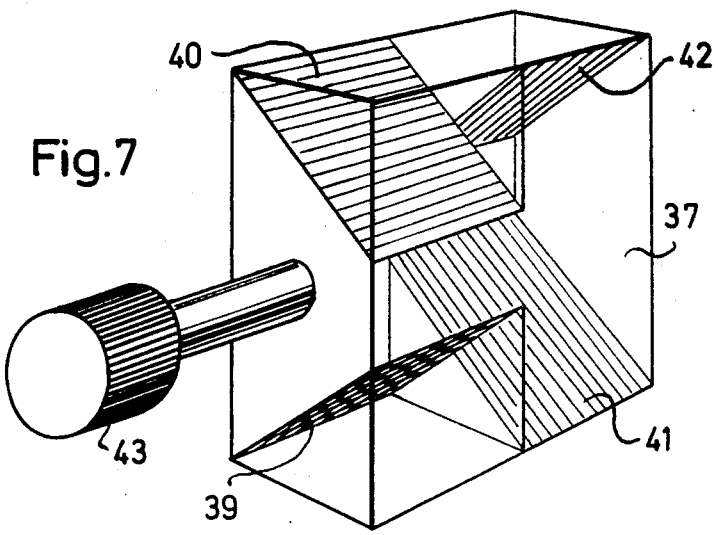
FIG. 7 diagrammatically shows the movable part of the switch of FIG. 6.

In FIG. 6 there is shown a switch whose housing 36 has six receiving couplings arranged in the plane of the drawing, for centering plugs 31 which connect the light guide 32 firmly by screws 33 to the housing 36. Within the housing 36 there is a transparent ring 35 of six aspheres which lie in each case opposite the receiving couplings. The ring 35 has a rectangular opening and receives a slide 37, which is also transparent and which contains several mirrors or beam splitters 39–42.

If the side is in the position shown in FIG. 6, then the light fed via the plug 51 is distributed over the full mirror 39 and the beam splitter 40 onto the light guides 32 and 54. When the slide 37 is pulled out by means of the handle 43, the beam splitters 41 and 42 enter into the ray path as a result of which, for instance, the light fed via the plug 51 is distributed over the outputs 55 and 56. If suitably combined wavelength-selective beam splitters are used it is possible in this way to obtain switchable demultiplexers (channel selectors). In this case also immersion oil is present between the slide 37 and the asphere ring 35 and the surfaces of the aspheres are provided with an anti-reflection coating.

Figure 9:
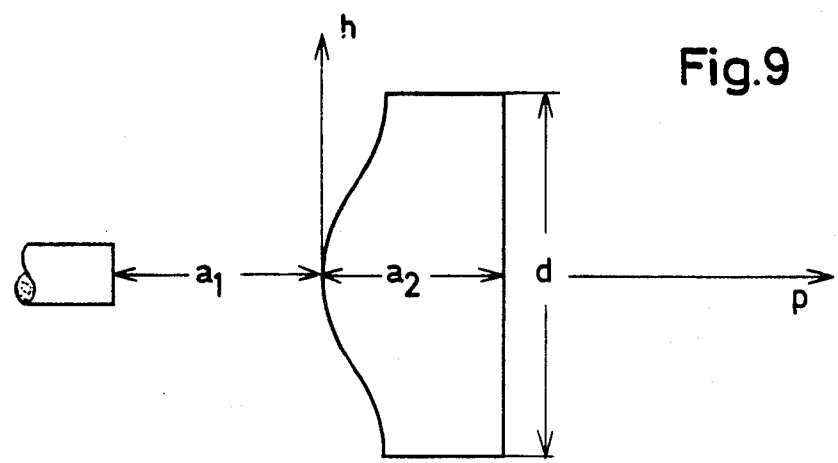
FIG. 9 diagrammatically shows the relationship of the aspherical element with its equation.

The switches shown in FIGS. 5 and 6 as well as 7 are constructed in accordance with the arrangement already described in FIGS. 1 and 3 with the use of aspheres. For this arrangement it has proven advisable to mold the imaging aspheres by injection molding from plastic having an index of refraction of $n_d = 1.49$ and an Abbe number of $\nu = 56$ and to establish the geometrical data in accordance with the following table:

distance between light guide and lens vertex $a_1 = 30$
thickness of the asphere $a_2 = 8.0$
diameter of the asphere $d = 18$
vertex radius of the asphere $r = 15.1$ The shape of the aspherical surface satisfies the following equation $$p = (h^2/2r) - 4.6 \times 10^{-5} h^4 + 1.3 \times 10^{-7} h^6 - 3.8 \times 10^{-10} h^8 + 7.7 \times 10^{-13} h^{10}$$

in which p is the sagitta and h the height in accordance with the showing of FIG. 9. With the arrangement described above excellent adaptation to the radiation characteristic of light guides in the sense of a minimizing of the coupling losses is obtained.

Figure 8:
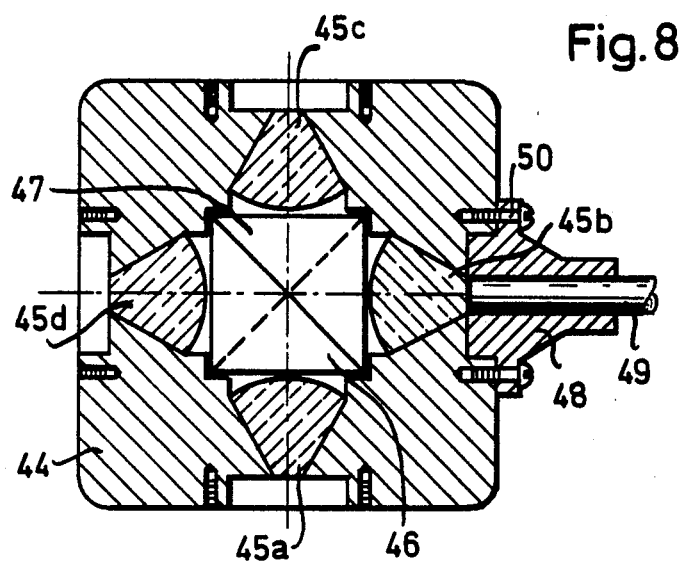
FIG. 8 diagrammatically shows an optical switch according to an embodiment which is an alternative to FIGS. 5 to 7.

The switch shown in FIG. 8, on the other hand, uses an arrangement such as already shown in FIGS. 2 and 4. Four conical convex lenses 45a–d arranged in a plane, form the light entrance windows of the receiving couplings arranged in the housing 44. The light guides 49 are in each case firmly connected via plugs 48 and their end surfaces are in direct immersion contact with the lenses 45.

Within the plug 44 there is a slide 46 which via mirrors 47 distributes the light fed by the light guide 49 alternately over the other outputs.

If instead of the mirror layer 47 a beam splitter whose transmission factor changes continuously in the direction of movement of the slide 46 is used, one obtains an optical valve with possibility of continuous variation of the coupling ratio.

I claim:

1. A device for connecting first and second light guides to an external part comprising:
   first and second light guide housing means for mounting said light guides corresponding to said first and second light guides, said light guides extending into said housing means; and
   a converging aspheric plano-convex lens for each of said first and second light guide housing means, constructed and arranged to be disposed so that the focal point of said lens is disposed at the end surface of said light guides, said plano-convex lens having an aspherically shaped surface and a planar surface, said aspherically shaped surface facing said light guides, said planar surface forming a coupling side surface and being constructed and arranged to support an immersion fluid disposed between said planar coupling side surface and said external part.

2. The connecting device according to claim 1, wherein said external part comprises a distributor for receiving said light guide housing means, said distributor including a distributor housing provided with at least three receiving couplings having inlet and outlet openings, said plano-convex lens being mounted within said distributor housing, the aspheric surface of said lens being disposed at said inlet and outlet openings, and a movably mounted beam splitter prism is disposed within said distributor housing in immersion contact with said planar surface of said lens.

3. The connecting device according to claim 2, wherein said aspheric lens of said receiving couplings are integrally formed as a single unit.

4. The connecting device according to claim 2, wherein said distributor housing, said receiving couplings and said lens consist of a single body of transparent material produced by injection molding, the surface of said single body being provided with an opaque coating except for the lens regions.

5. The connecting device according to claim 2, wherein said beam splitter prism is rotatably mounted between fixed detent positions, said device including an externally accessible handle for rotating said prism disposed outside of said distributor housing.

6. The connecting device according to claim 2, wherein said beam splitter is slidably displaceable between fixed detent positions and an externally accessible handle is disposed outside the distributor housing and coupled to said beam splitter prism to displace same.

7. The connecting device according to claim 1, wherein said external part comprises a distributor for receiving said light guide housing means, said distributor including a distributor housing mounting a beam splitter prism and being provided with at least three receiving couplings, each of said receiving couplings having inlet and outlet openings mounting a planar window on the coupling side surface, the diameter of which corresponds to the diameter of said plano-convex lens.

8. The connecting device according to claim 7, wherein said planar window of said distributor is formed by a flat surface of said beam splitter prism.

9. The connecting device as claimed in claim 7, wherein said beam splitter prism is wavelength-selective.

10. The connecting device according to claim 1, in which said first and second housings comprise two inter-engaging plugs, each of which mounts a corresponding light guide and said plano-convex lens, said inter-engaging plugs being fastened together so that said planar surfaces of said lenses are in immersion contact with each other.

11. The connecting device as claimed in claim 1, wherein at least one side of said plano-convex lens is provided with an anti-reflection coating.

12. The connecting device according to claim 1, wherein said plano-convex lens comprises plastic.

13. A device according to claim 1, characterized by the fact that the asphere satisfies the equation $$p = (h^2/2r) - 4.6 \times 10^{-5} h^4 + 1.3 \times 10^{-7} h^6 - 3.8 \times 10^{-10} h^8 + 7.7 \times 10^{-13} h^{10}$$

and the values set forth in the following table are maintained;
vertex radius of the asphere: r32 15
thickness of the asphere: $a_2 = 8$
distance between light guide and lens vertex: $a_1 = 30$.

* * * * *